(12) United States Patent
Chase et al.

(10) Patent No.: US 6,502,974 B2
(45) Date of Patent: Jan. 7, 2003

(54) INTEGRATED FLEXIBLE LAMP ASSEMBLY

(75) Inventors: Lee A. Chase, E. Grand Rapids; Jason A. Gilliam, Southfield, both of MI (US)

(73) Assignee: Lacks Enterprises, Inc., Grand Rapids, MI (US)

( * ) Notice: Subject to any disclaimer, the term of this patent is extended or adjusted under 35 U.S.C. 154(b) by 0 days.

(21) Appl. No.: 09/909,041

(22) Filed: Jul. 19, 2001

(65) Prior Publication Data

US 2001/0040811 A1 Nov. 15, 2001

Related U.S. Application Data

(63) Continuation-in-part of application No. 09/809,688, filed on Mar. 15, 2001, which is a continuation-in-part of application No. 09/491,046, filed on Jan. 25, 2000, which is a continuation-in-part of application No. 09/252,437, filed on Feb. 18, 1999, now Pat. No. 6,190,030.

(51) Int. Cl.[7] ................................................ F21V 15/04
(52) U.S. Cl. ...................................... 362/549; 362/390
(58) Field of Search ................................ 362/538, 390, 362/549, 189, 278, 507

(56) References Cited

U.S. PATENT DOCUMENTS

| 243,273 A | 6/1881 | Jones |
|---|---|---|
| 343,605 A | 6/1886 | Phoenix |
| 1,572,024 A | 2/1926 | MacInnes |
| 1,577,937 A | 3/1926 | Slusser |
| 1,993,675 A | 3/1935 | Long |
| 2,613,099 A | 10/1952 | Arbib |
| 3,088,022 A | 4/1963 | Schmidt |
| 3,196,265 A | 7/1965 | Schneider |
| 3,457,397 A | 7/1969 | Tindall |
| 3,998,178 A | 12/1976 | Dutot et al. |
| 4,058,720 A | 11/1977 | Renfrow |
| 4,310,872 A | 1/1982 | Lauve |
| 4,380,099 A | 4/1983 | Dick et al. |
| 4,420,797 A | 12/1983 | Tohata |
| 4,445,165 A | 4/1984 | Sherwood et al. |
| 4,466,646 A | 8/1984 | Delmastro et al. |

(List continued on next page.)

FOREIGN PATENT DOCUMENTS

| DE | 3802104 | 8/1989 |
|---|---|---|
| EP | 0030427 | 11/1980 |
| EP | 0422405 | 9/1990 |
| EP | 1048895 | 4/1999 |
| JP | 57178947 | 11/1982 |
| JP | 61263846 | 11/1986 |
| JP | 585287 | 4/1993 |
| JP | 6171445 | 6/1994 |

*Primary Examiner*—Sandra O'Shea
*Assistant Examiner*—Hargobind S. Sawhney
(74) *Attorney, Agent, or Firm*—Price, Heneveld, Cooper, DeWitt & Litton

(57) ABSTRACT

A lamp assembly provides an integrated flexure member/bezel extending between a lamp lens and a housing for the lamp reflector. The flexure member has forward and rearward peripheral edges shaped to conform to the mating shapes of the lens and housing, respectively, for holding the elements together. The flexural member has internal surfaces which extend rearwardly toward the reflector surrounding the edges of the reflector such that no gaps are visually present and which can be metalized such that the overall lamp assembly has a shiny appearance.

31 Claims, 8 Drawing Sheets

U.S. PATENT DOCUMENTS

| | | |
|---|---|---|
| 4,475,148 A | 10/1984 | Tomforde |
| 4,532,578 A | 7/1985 | Gaden et al. |
| 4,539,626 A | 9/1985 | Hawlitzki et al. |
| 4,556,931 A | 12/1985 | Wheatley |
| 4,569,007 A | 2/1986 | Dick |
| 4,602,319 A | 7/1986 | Moriyama et al. |
| 4,644,447 A | 2/1987 | Stürtz et al. |
| 4,658,335 A | 4/1987 | Culler |
| 4,667,995 A | 5/1987 | Wilkins |
| 4,758,034 A | 7/1988 | Ghezzi et al. |
| 4,786,093 A | 11/1988 | Nishii |
| 4,920,460 A | 4/1990 | Mori |
| 4,931,912 A | 6/1990 | Kawakami et al. |
| 4,974,125 A | 11/1990 | McGehee |
| 5,010,456 A | 4/1991 | Reichman et al. |
| 5,060,122 A | 10/1991 | Miyoshi |
| 5,237,489 A * | 8/1993 | Stein et al. ............... 362/226 |
| 5,243,501 A * | 9/1993 | Makita et al. ............ 362/293 |
| 5,243,503 A | 9/1993 | Hu |
| 5,267,128 A | 11/1993 | Shamir et al. |
| 5,288,117 A | 2/1994 | Vogelgesang |
| 5,364,142 A | 11/1994 | Coiner |
| 5,373,425 A | 12/1994 | Shirai |
| 5,388,037 A | 2/1995 | Umeda et al. |
| 5,390,087 A | 2/1995 | Daumueller et al. |
| 5,398,172 A | 3/1995 | Kojima et al. |
| 5,428,510 A | 6/1995 | Shirai et al. |
| 5,448,454 A | 9/1995 | Nonaka |
| 5,497,301 A | 3/1996 | McMahan et al. |
| 5,497,303 A | 3/1996 | Decinti et al. |
| 5,519,588 A | 5/1996 | Sobeck et al. |
| 5,556,190 A | 9/1996 | Saijo |
| 5,582,475 A | 12/1996 | Yagi |
| 5,607,218 A | 3/1997 | Choji |
| 5,607,221 A | 3/1997 | Justus |
| 5,651,604 A | 7/1997 | Dobler et al. |
| 5,678,916 A | 10/1997 | Watanabe et al. |
| 5,688,043 A | 11/1997 | Watanabe et al. |
| 5,702,148 A | 12/1997 | Vaughan et al. |
| 6,190,030 B1 | 2/2001 | Chase |

\* cited by examiner

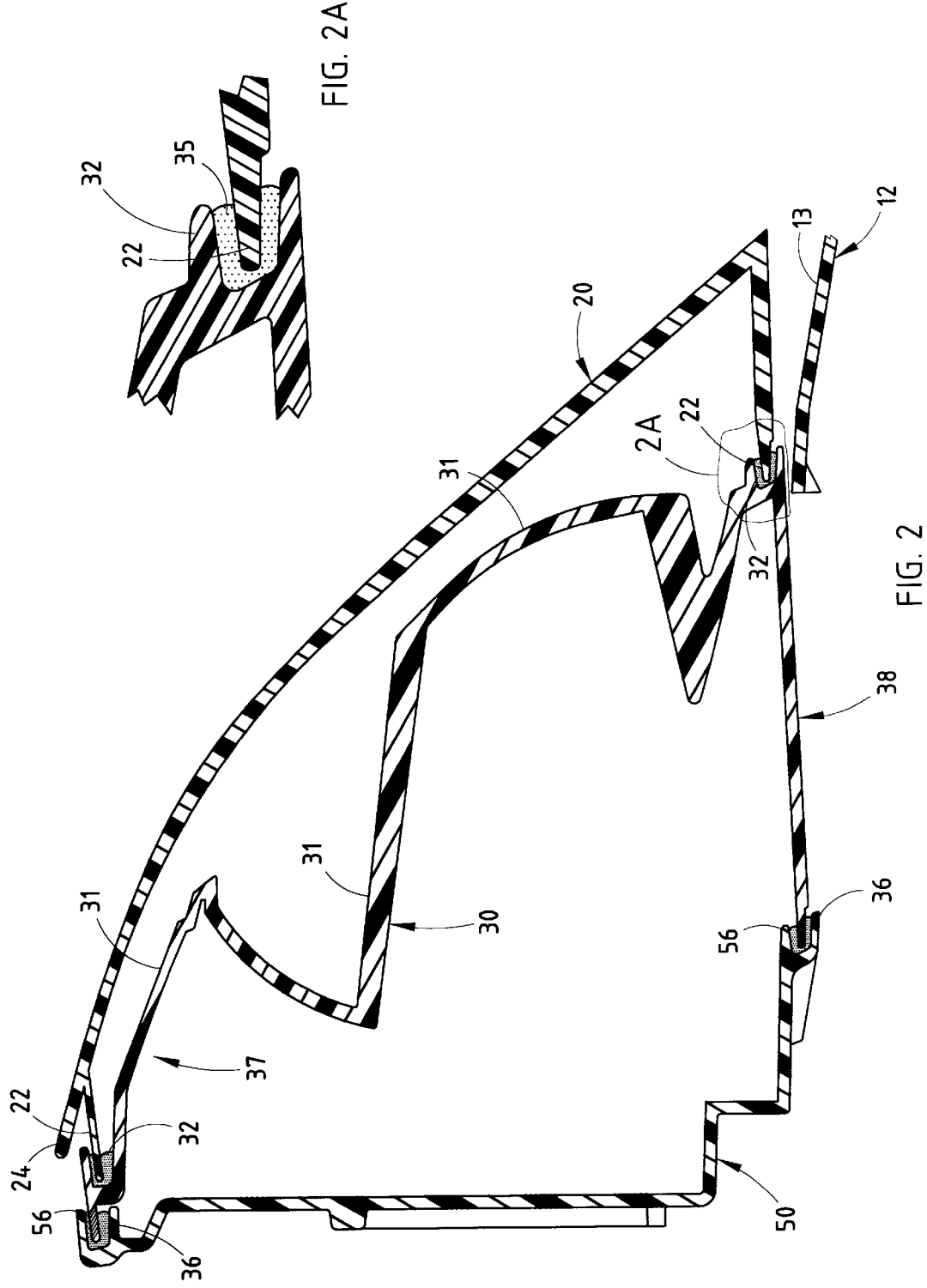

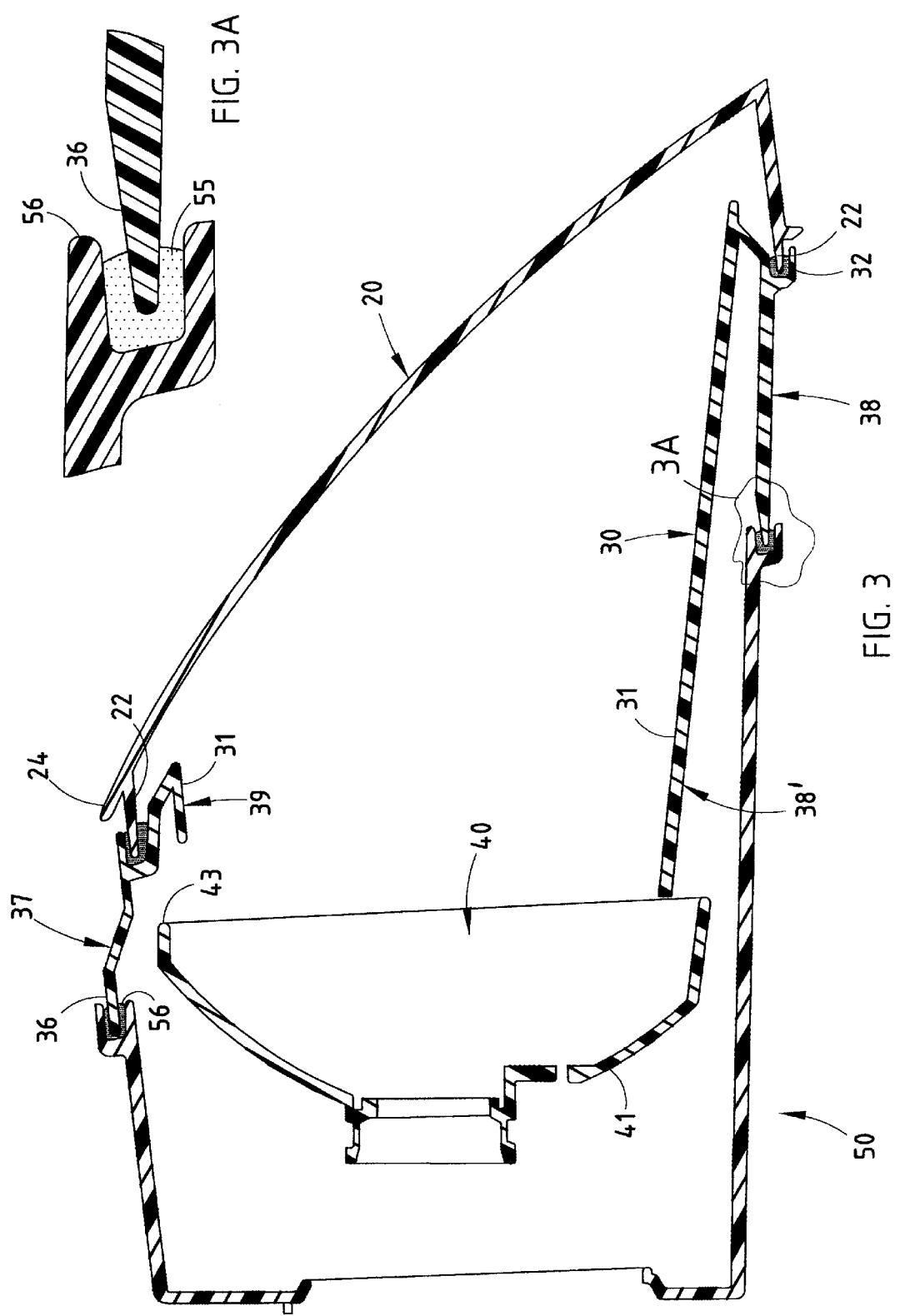

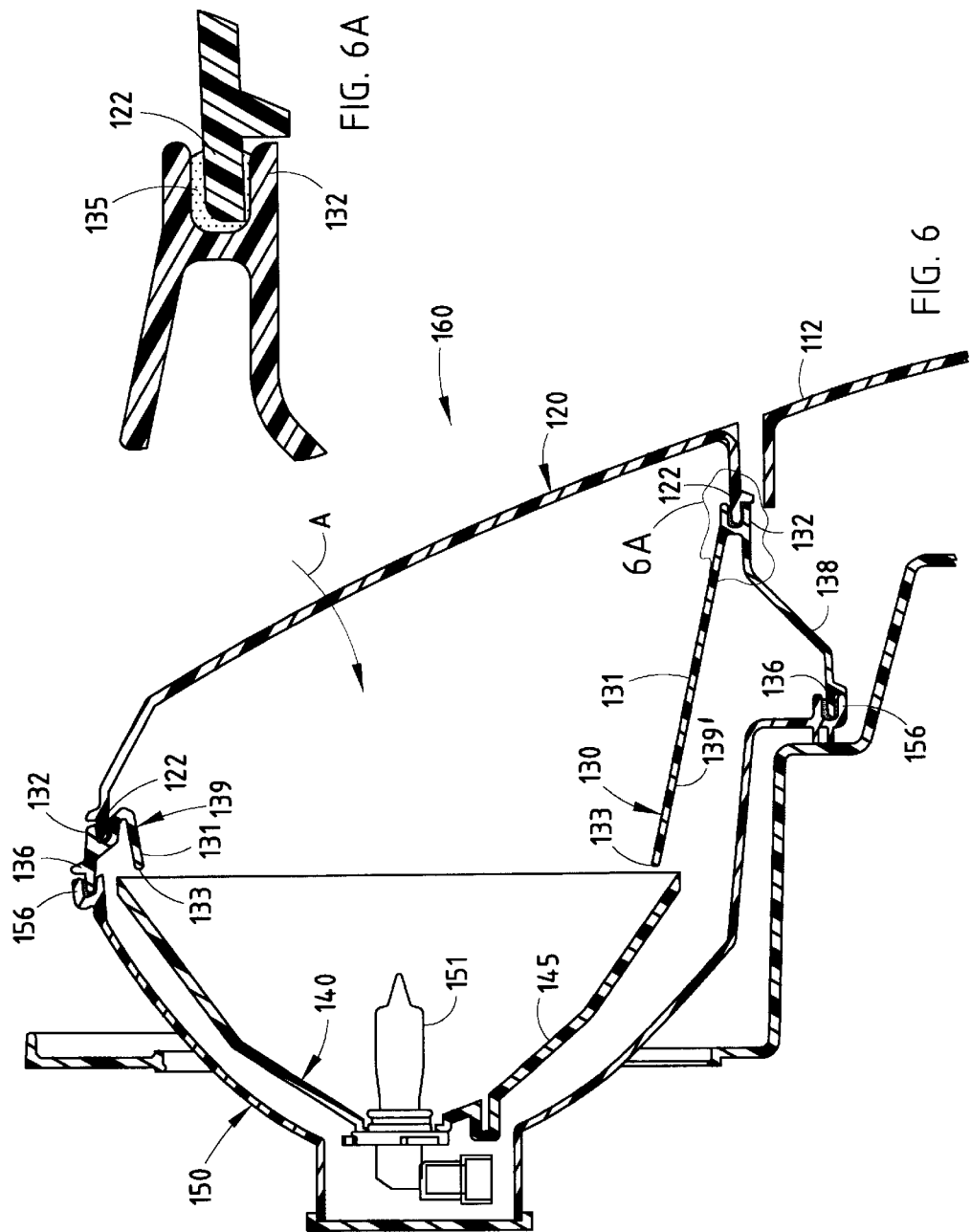

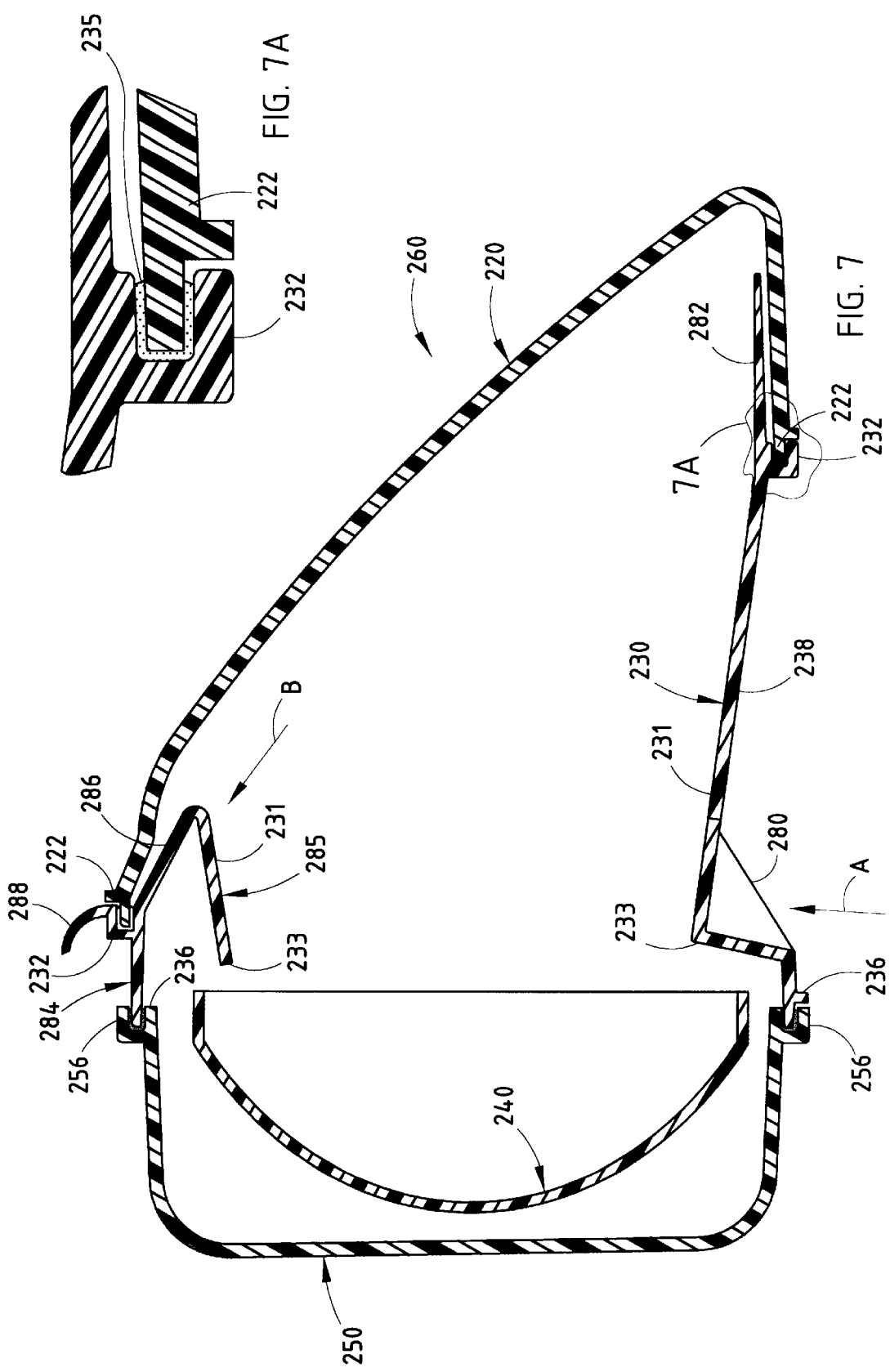

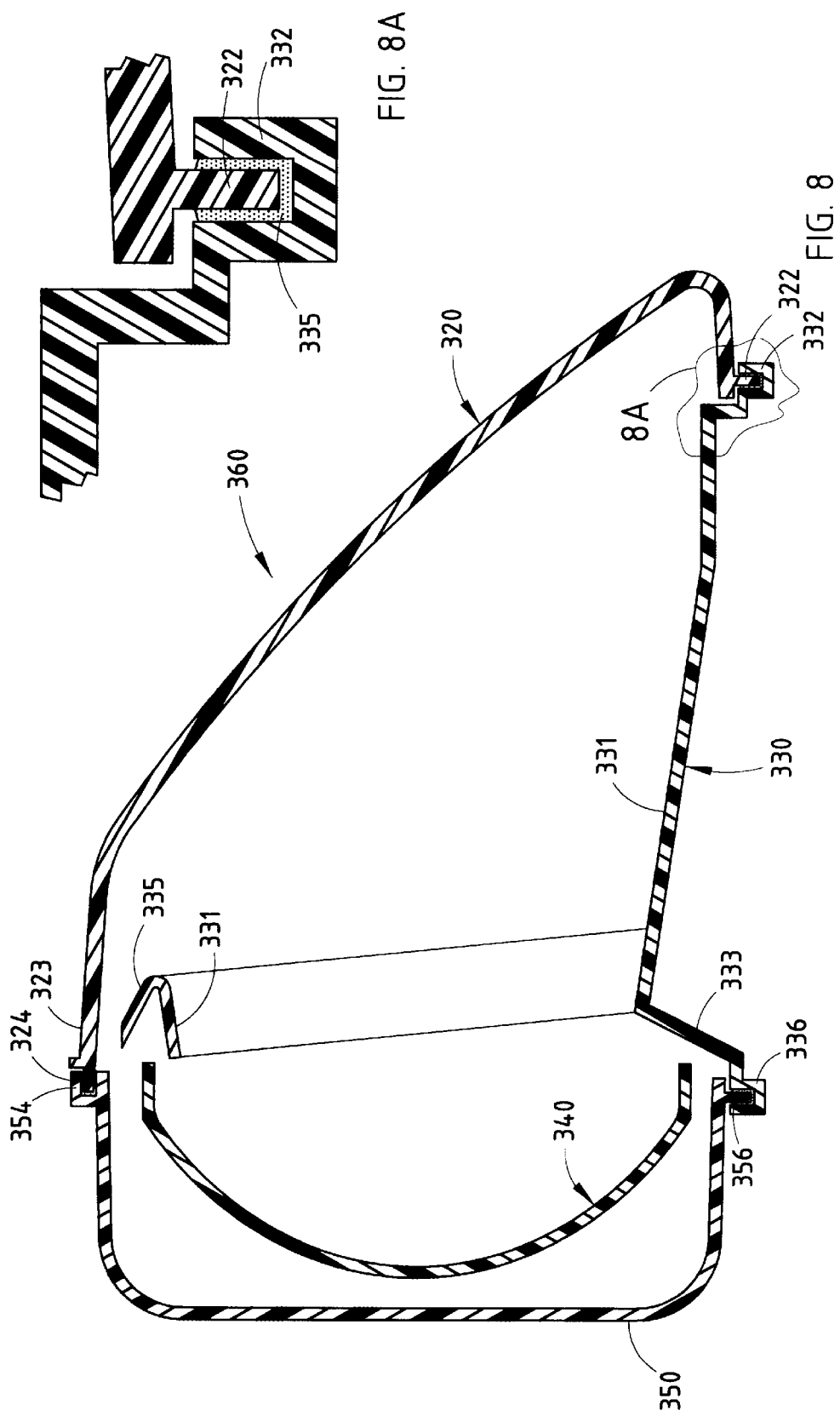

INTEGRATED FLEXIBLE LAMP ASSEMBLY

CROSS REFERENCE TO RELATED APPLICATION

This application is a continuation-in-part application of copending U.S. patent application Ser. No. 09/809,688 filed Mar. 15, 2001, entitled FLEXIBLE LAMP MOUNTING, which is a continuation-in-part of U.S. patent application Ser. No. 09/491,046 filed Jan. 25, 2000, which is a continuation-in-part of U.S. patent application Ser. No. 09/252,437 filed Feb. 18, 1999, now U.S. Pat. No. 6,190,030 B1, the disclosures of which are incorporated herein by reference.

BACKGROUND OF THE INVENTION

The present invention relates to vehicle lamps and particularly lamp assemblies which are capable of elastic deformation upon impact with a foreign object.

As vehicles become increasingly aerodynamically designed, there is a desire to provide headlamp and tail lamp assemblies which are integrated into the bodywork and bumpers of the vehicle to provide sleek, smooth, aerodynamic styling. When, however, the lamp assembly is substantially flush with either of the vehicle's bumpers, an impact with a foreign object by the bumper could cause destruction of the lamp assembly and/or personal injury if a pedestrian is struck. Current headlamp assemblies typically employ a functional bulb reflector which, in turn, is surrounded by what is referred to as a "bright" bezel, which is a rigid high heat resistant material, such as nylon or polycarbonate vacuum metalized with aluminum to create a lamp assembly with an overall shiny or bright appearance when viewed through the lens. Such lamp assemblies will, however, be destroyed if placed flush with a vehicle bumper, when subjected to an impact force.

With flexible headlamp assemblies, such as disclosed in U.S. Pat. No. 6,190,030 and other proposals, there are significant gaps between the reflector and the flexural member, which require the utilization of a separate bright bezel to obtain the bright appearance of existent headlamp assemblies to which the consumers and designers have been accustomed.

Accordingly, there exists a need for a flexible lamp assembly which can be flush-mounted with a vehicle bumper and which elastically deforms, preventing damage to the lamp assembly, while at the same time providing an economical and acceptable appearing lamp assembly for the automotive industry and its consumers.

SUMMARY OF THE INVENTION

The lamp assembly of the present invention satisfies this need by providing an integrated bright bezel and flexural member extending between a lamp lens and a housing for the lamp reflector. The flexural member is shaped to generally conform to the shape of the lens for receiving the peripheral edge of the lens for bonding the two elements together. Further, the flexural member has metalized bright surfaces which extend rearwardly to surround the edges of the reflector such that no gaps are visibly present, and the lamp assembly has an overall shiny appearance.

In one embodiment of the invention, an integrated flexural member and bright bezel is formed and includes a wall between the lens and housing and an extension extending inwardly within the interior of the lens and housing having a facing surface coated with a material to present a shiny surface. In some embodiments, the flexural member itself may have at least a section with a surface facing the interior of the headlamp assembly which is coated to present a bright or shiny surface. In all embodiments, the use of a separate bright bezel is unnecessary and a flexible lamp mounting is provided.

With such construction, a relatively inexpensive flexible lamp assembly is provided which has the appearance of conventional multi-piece rigid lamp assemblies and yet enjoys the features of flexible lamp assemblies for cost, durability, impact resistance, and safety. These and other features, objects and advantages of the present invention will become apparent upon reading the following description thereof together with reference to the accompanying drawings.

BRIEF DESCRIPTION OF THE DRAWINGS

FIG. 2 is a cross-sectional view of the headlamp assembly of FIG. 1 taken along section line II—II of FIG. 1;

FIG. 2A is an enlarged fragmentary view of the encircled area 2A in FIG. 2;

FIG. 3 is a cross-sectional view of the headlamp assembly area of FIG. 1 taken along section line III—III of FIG. 1;

FIG. 3A is an enlarged fragmentary view of the encircled area 3A in FIG. 3;

FIG. 6 is a cross-sectional view of the headlamp assembly of FIG. 5 taken along section line VI—VI of FIG. 5;

FIG. 6A is an enlarged fragmentary view of the encircled area 6A in FIG. 6;

FIG. 7 is a cross-sectional view of another embodiment of the present invention; FIG. 7A is an enlarged fragmentary view of the encircled area 7A in FIG. 7;

FIG. 8 is a cross-sectional view of another embodiment of the present invention; FIG. 8A is an enlarged fragmentary view of the encircled area 8A in FIG. 8.

DETAILED DESCRIPTION OF THE PREFERRED EMBODIMENT

Figure 1:
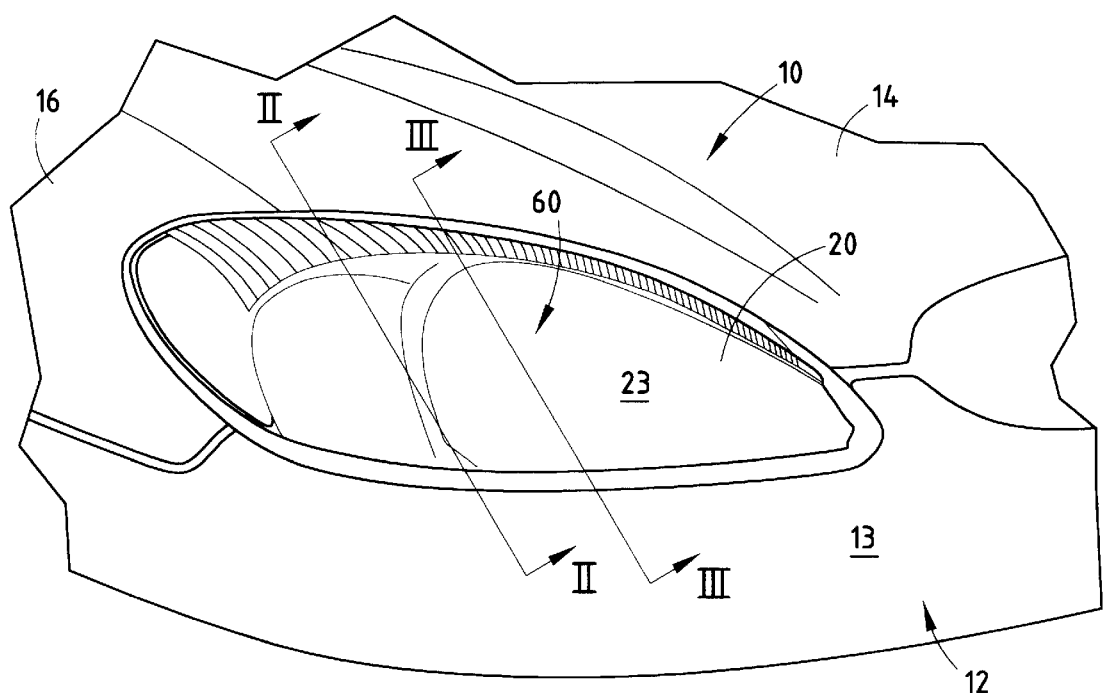
FIG. 1 is a fragmentary perspective view of a vehicle having a headlamp with an integrated flexural member/bezel embodying the present invention.

Referring initially to FIG. 1, there is shown a vehicle 10, such as an automobile, and particularly the right front quadrant thereof. Automobile 10 includes a bumper 12 having an outer surface 13 which is substantially flush with the surface 23 of the lens 20 of headlamp assembly 60. The vehicle hood 14 extends around a portion of the outer periphery of lens 20, as does the right front fender 16. The invention has application to other vehicle designs in addition to that shown in FIG. 1. Thus, the invention can be employed, for example, in vehicles in which the bumper(s) and/or other body parts extend beyond the lens.

As can be seen in FIG. 1, the overall appearance of the vehicle with the flush-mounted headlamp assembly 60 and bumper 12 is aerodynamically pleasing, however, it exposes the lens 20 and lamp assembly 60 to damage if the vehicle impacts a foreign object. In order to survive low speed side and front impacts without permanent damage and, for example, at least the U.S. standard five mile per hour test for bumpers, the headlamp assembly 60 is manufactured according to the present invention, as best seen in connection with FIGS. 2–4 now described.

Figure 4:
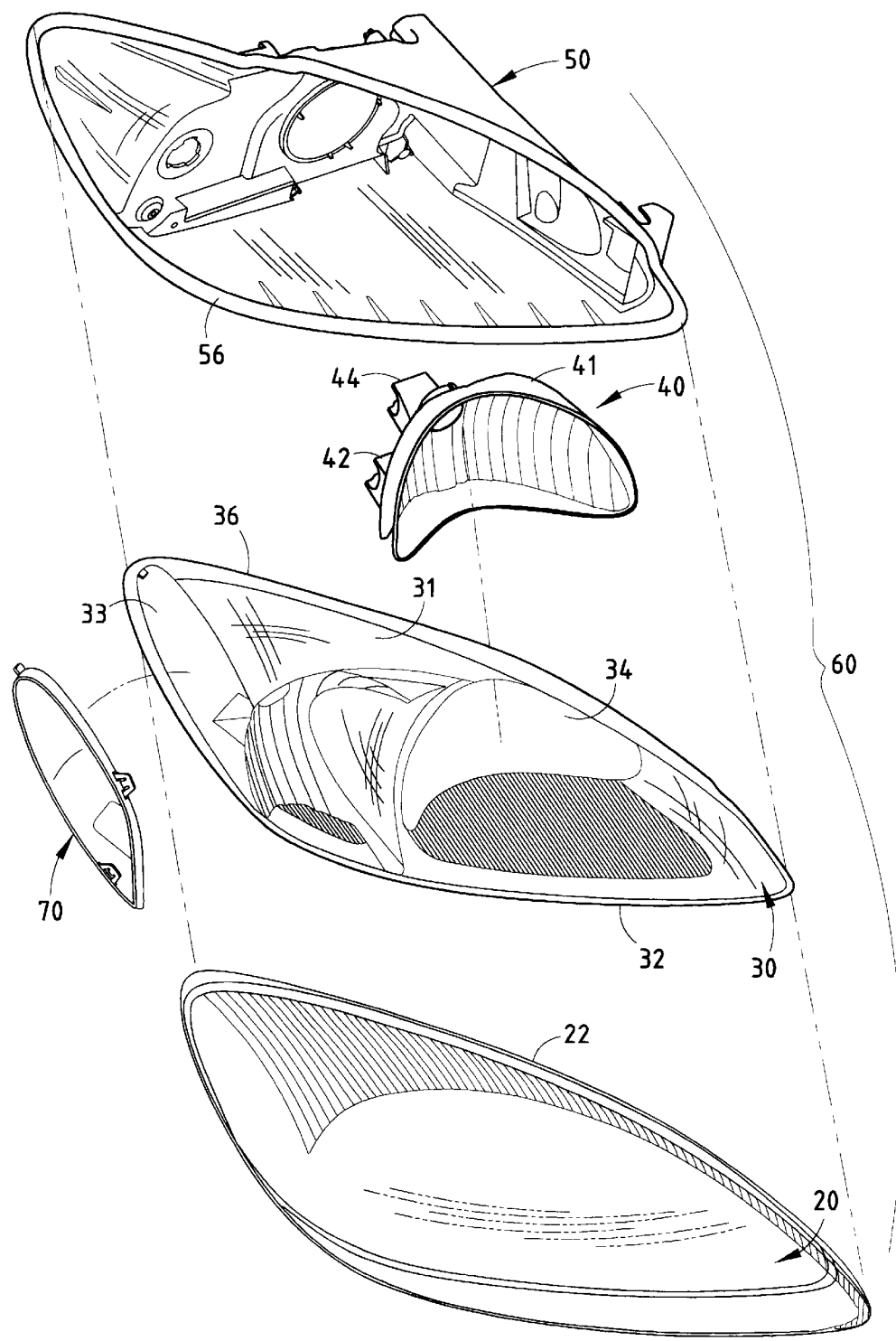
FIG. 4 is an exploded perspective view of the elements of the headlamp assembly shown in FIGS. 1–3.

FIGS. 2 and 3 are cross sections of assembly 60, while FIG. 4 is an exploded perspective view showing the generally oval lens 20 which is made of a clear polymeric material, such as polycarbonate, and which has a rearward facing peripheral flange 22 which fits within a forwardly facing peripheral glue track 32 in the integrated flexural member/bright bezel 30. Flange 22 and track 32 are shaped to conform and mate with one another to provide a continuous junction between the lens 20 and member 30. Along at least the upper section of lens 20 is an overlying flange 24 (FIGS. 2 and 3) to esthetically cover and protect the interconnection of flange 22 and track 32, which is filled with a suitable bonding adhesive, such as a urethane or silicone, designated by reference 35 (FIG. 2A) during assembly, to bond the lens to the integrated flexural member 30.

The integrated flexural member/bezel 30, as best seen in FIG. 4, includes an opening 34 aligned with the reflector 40 of headlamp assembly 60 and a second opening 33 aligned to receive a side marker subassembly 70 therein. Reflector 40 includes mounting tabs 42 and 44 spaced along the rear surface 41 thereof facing toward the generally concave housing 50 for receiving suitable threaded fasteners (not shown) attaching the reflector with its lamp and socket to the housing 50. Housing 50 includes at least one opening for a head light source and could contain an aperture for a secondary light source, a side marker, park and turn lights, or fog lens. The flexural member is described in greater detail below but also includes a rearwardly facing flange 36 extending around the periphery thereof and shaped to continuously extend within a peripheral glue track 56 of housing 50. The junction between flange 36 and glue track 56 is filled with a suitable bonding adhesive, such as a urethane, silicone, or other suitable material identified by reference numeral 55 in FIG. 3A, to bond the flexural member 30 and lens 20 to housing 50 during assembly. Other fastening structure, such as snap fittings with suitable sealing rings or gaskets, could also be employed, as could spaced threaded fasteners with such sealing members. Also, the interconnections can be oriented in any manner as long as the mating parts are secured together in sealed relationship. Housing 50 typically is integrally molded of a polymeric material, such as filled polypropylene, polycarbonate, a thermosetting polyvinyl ester or the like.

The geometry of the lens, housing, integrated flexural member, and reflector will, of course, depend upon the particular vehicle in which the assembly 60 is installed. In the embodiment of FIGS. 1–4, the integrated flexural member includes a forward facing peripheral glue track or flange for receiving the peripheral flange or glue track of the lens for bonding the lens therein and a rearward facing flange or glue track which is received and bonded in a forward facing glue track of the housing. The flanges and glue tracks can be on either the lens, flexural member, or housing, thus these mating elements can be reversed if desired or oriented at different angles as, for example, shown in FIGS. 8 and 8A.

In the embodiment shown in FIGS. 1–4, the flexural member 30 includes forward facing internal continuous surfaces 31 which are visible from a direction outside of the lens 20. The exposed surfaces 31, in a preferred embodiment, are covered by a shiny material, such as by a vapor deposition coating process using aluminum or other metal to provide a bright surface. Depending upon the lighting and appearance effects desired, however, the visible surfaces 31 can be of any desired color and degree of reflectivity. The integrated flexural member 30 includes a peripheral flexible wall, shown at areas 37 and 38 in FIGS. 2 and 3, which is made of flexible material, such as urethane thermoplastic (TPU), rubber modified polypropylene (TPO), urethane, thermoplastic elastomer (TPE), and the like, designed as taught in U.S. Pat. No. 6,190,030, the disclosure of which is incorporated herein by reference, to flex upon impact of the lens with a foreign object and prevent the destruction of the headlamp assembly 60 in the event of a low mph impact.

In the embodiment shown in FIGS. 1–4, the integrated flexural member/bezel 30 includes, for example, as seen in FIG. 2, one area which includes a lower flexural wall 38 and an outer facing upper aluminum metalized shiny surface 31 and an integral flexural wall section 37 which is made of the same flexural member such that, if impacted, it will not destroy the reflector 40. The integrated bright surface of walls 31 of flexural member 30 may be selectively made of a rigid thermoplastic or thermosetting material, such as ABS, polycarbonate, and the like, in a two-shot molding process.

Depending upon the particular geometry of a vehicle headlamp assembly, the flexural member/bezel 30 may, as seen in FIG. 3, include one or more integral internally extending bright surfaced walls, such as extension wall 38' extending within the lower section of reflector 40. Since this section faces and is closely adjacent reflector 40, it is desirable to have it also made of the flexible material coated at surface 31 to present a bright surface. Member 30 may include side and upper wall sections, such as section 39 (FIG. 3), which need not be flexible but which is exposed to heat from the lamp and, therefore, is made of a heat-resistant material, such as polycarbonate, coated to present a shiny surface 31. In all cases, the flexural member/bezel 30 includes a peripheral wall with a forward facing shiny or other desired surface 31 which encloses the gap space between the outer periphery 43 of reflector 40 and the peripheral edges of housing 50 so that only a desired appearance is presented when looking through lens 20. As can be appreciated, the exact three-dimensional shape of the flexural member 30 and its composition to accommodate static and dynamic forces and temperature will vary from vehicle to vehicle.

Figure 5:
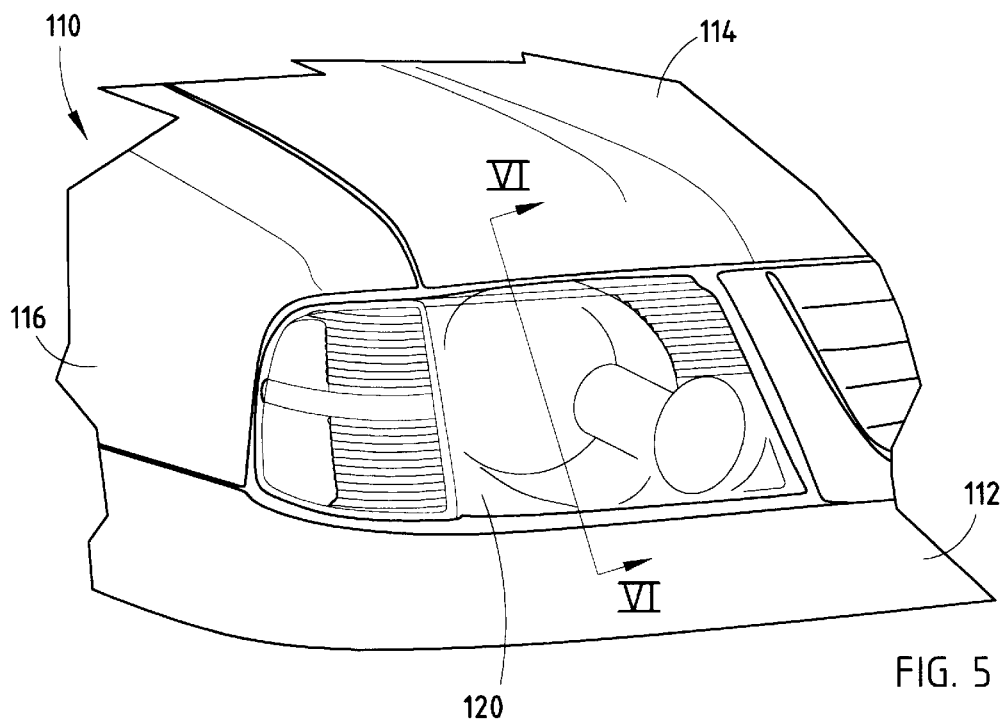
FIG. 5 is a fragmentary perspective view of an another vehicle having an alternative embodiment of the integrated flexural member/bezel of the present invention.

As illustrated by another embodiment of the invention shown in FIGS. 5 and 6, a different vehicle 110 is shown having a flush bumper 112, hood 114 which is flush with the lens 120 and right front fender 116. The headlamp assembly 160 of vehicle 110 is shown in the cross-sectional view of FIG. 6, which includes a relatively flat surface front lens 120 with a peripheral rearwardly facing flange 122 which extends within a peripheral forwardly facing glue track 132 of flexural member/bezel 130 and is bonded thereto with a suitable bonding adhesive, such as urethane or silicone 135, as best seen in FIG. 6A. A reflector 140 is mounted to a housing 150 in a conventional manner to support lamp 151 therein in additional to other typical lamps included in the headlamp assembly 160 shown.

The integrated flexural member/bezel 130 includes a peripheral flange including an outer flexible wall 138, which is made of the same flexible material as in the first embodiment, and an upper inner wall 139 with an aluminized coating for presenting a bright surface 131 to the assembly 160 when viewed through lens 120. The upper section of wall 139 near lamp 151, due to its proximity to lamp 151 and the particular geometry of member 130, need not be flexible but rather will allow the downward and inward pivoting, as indicated by arrow A, of lens 120 and flexible member 130 to prevent damage. Upper section 139 is made of a heat-resistant polycarbonate or other material which can be integrally molded with the remaining sections of the integral flexural member/bezel 130 using a two-shot molding process for the dissimilar materials which may be employed. Conventional masking can be employed during the metalized coating of member 130, such that only the desired visible surfaces are coated. Member 130, as in the first embodiment, includes a lower wall section 139', which extends above flexural wall 138 and has a bright aluminized metal surface 131 exposed to lens 120. Wall section 139' may also be made of the same flexible material as wall 138 to prevent damage to reflector 140 in the case of an impact.

As with the first embodiment, the integrated flexural member/bezel 130 of the embodiment shown in FIGS. 5 and 6 includes a rearwardly projecting peripheral lip 133. Lip 133 extends within the open face of reflector 140 and any other reflectors, such as for turning signals, side lights, and the like, to present only a bright surface 131 when looking through lens 120. Thus, only metalized aluminum surfaces 131 of the integrated flexural member or the bright reflective surfaces 145 of reflector 140 are seen as in the other embodiments. The flexural member 130 includes a rearwardly projecting peripheral flange 136 which extends within peripheral glue track 156 of housing 150, in turn, mounted to the sheet metal frame 165 of vehicle 110 in a conventional manner. The joint between rearward projecting peripheral flange 136 and glue track 156, as in the first embodiment, is adhesively bonded by a suitable adhesive, such as urethane, silicone, or the like, similar to that shown in the front joint identified by reference numeral 135 in FIG. 6A.

Another embodiment showing different features of the present invention is illustrated by the vertical cross-sectional view of FIG. 7, which illustrates areas of an integrated flexural member/bezel 230 for a vehicle headlamp assembly 260 which includes a lens 220 therein. In this embodiment, the junction of the flexural member/bezel 230 with the lower edge of housing 250 may be reinforced by a plurality of fillets 280 spaced therealong to add some rigidity to the area identified by arrow A in FIG. 7. Fillets 280 may be made of a more rigid polymeric material, such as a polycarbonate, two-shot molded with the remainder of the flexural member/bezel 230, which includes a lower wall section 238 made of flexible material, as described above, to allow its flexing in the event of an impact against lens 220. Alternatively, the edge could be selectively molded with a rigid material. The exposed surfaces 231 facing lens 220 of section 238 and an integral forwardly projecting flange 282 is coated with aluminized metal. As with each of the embodiments, the integrated flexural member/bezel includes peripheral lips 233 in areas where there are reflectors, such as headlamp reflector 240, which extend internally from the peripheral lip 241 of the reflector, such that no gap between the edge of the reflector and housing 250 is visible from the outside of the lamp assembly 260.

The upper area in the area illustrated by arrow B in FIG. 7 of flexural member/bezel 230 includes integrated upper and lower legs 284 and 285 joined by an intermediate section 286, all integrally molded of a flexible material as described above in connection with the FIGS. 1–3 embodiment. If desired, the legs can be selectively two-shot molded using a more rigid material to achieve the desired structural effect for a given lamp assembly. Additionally, extending upwardly and curved rearwardly from leg 284 is a gimp 288 also made of a flexible material and designed to flex and seal against the inner surface of the vehicle hood (not shown) for a particular vehicle with which the headlamp assembly 260 may be employed. Thus, the integrated flexural member/bezel 230 may additionally include an exterior sealing member, such as gimp 288. As with the earlier embodiments, the flexural member 230 includes a forward facing glue track 232 extending peripherally around the member 230 and receiving a rearward facing peripheral flange 222 of lens 220 and adhesively bonded therein by means of an adhesive, such as urethane or silicone 235, as seen in FIG. 7A. As in the other embodiments as well, the flexural member/bezel 230 includes a rearwardly extending peripheral flange 236 which fits within a similarly configured glue track 256 of housing 250 and is secured therein by means of bonding adhesives, such as urethane or silicone.

In any of the embodiments, if certain areas of the flexible sections of the flexure member/bezel is desired, it can be controlled by suitable slots extending partially therethrough or reinforced by fillets such as fillets 280 spaced at areas were either the flexibility of the material is desired to be increased or the rigidity of the flexible member is desired to be increased. Further, areas such as area B in FIG. 7, which may extend closely adjacent the lamp (not shown) mounted within reflector 240 and thereby subject to significant heat, can be made of a material such as polycarbonate which is integrally two-shot molded with the remaining flexible material, such as TPU, TPO, or TPE as described above.

Figure 9:
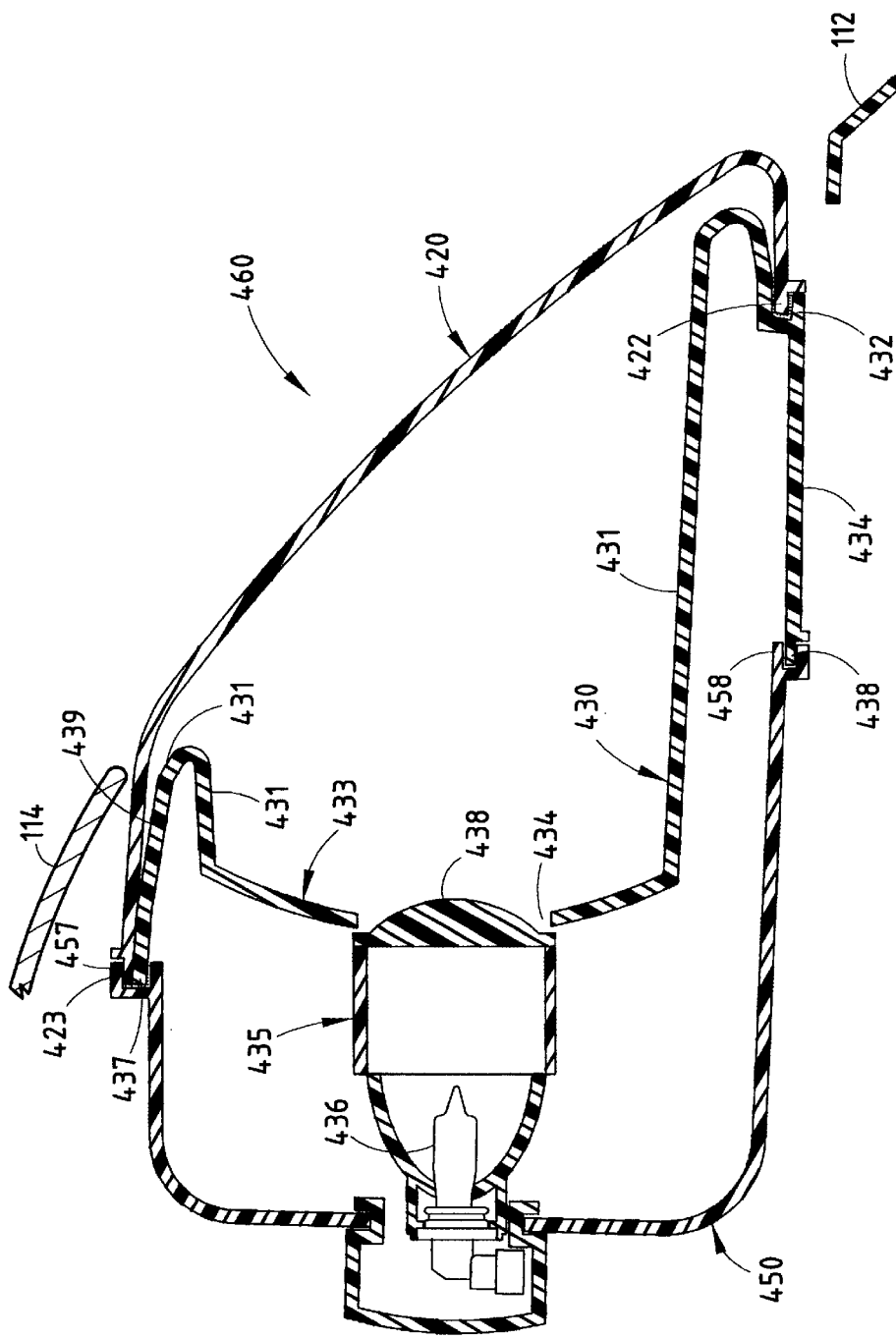
FIG. 9 is a cross-sectional view of another embodiment of the present invention.

FIGS. 8 and 9 show alternative embodiments of the invention. In FIG. 8, there is shown a headlamp assembly 360 having a headlamp lens 320 with a downwardly projecting mounting flange 322 at its lower end, which is best seen in FIG. 8A. It is received within a vertically upwardly extending socket or glue track 332 and can be bonded thereto utilizing a suitable bonding adhesive as in the other embodiments. An integrated flexural member 330 having a treated surface 331, which can be shiny or a selected reflectivity and desired color, extends from the flange 322 of lens 320 rearwardly and inwardly to extend into the area of reflector 340 for a headlamp (not shown), which reflector is conventionally mounted in a housing 350. The flexural member 330 includes a downwardly inclined rear wall 333 with a vertically upwardly extending opening socket or glue track 336 for receiving a downwardly extending leg 356 of housing 350, which fits within the peripheral glue track 336 and is bonded thereto with a suitable bonding adhesive, as in the prior embodiments. At the upper end of the lamp assembly 360, the structural member 330 includes an angled wall 335 with a treated surface 331 extending downwardly in the direction of reflector 340 and an upper end which is supported by the integral peripheral wall of the flexural member 330.

In the embodiment shown in FIGS. 8 and 8A, the upper section 323 of lens 320 includes a mounting flange 324, which extends horizontally rearwardly and mates within a horizontally forwardly extending glue track 354 of housing 350 and is bonded with a bonding adhesive. Thus, in the embodiment shown in FIGS. 8 and 8A, the junction of the lens to the flexural member is oriented in a direction generally orthogonal to the horizontal orientation as in the previous embodiments. As can be appreciated, the orientation of the junction of the lens to the flexural member and/or the flexural member to the housing can be any desired angle and may be joined, as noted above, utilizing a snap-fit and sealing ring or gasket and/or the use of suitable threaded fasteners at spaced intervals to join the members in sealed engagement with one another.

FIG. 9 is another embodiment of the invention in which a conventional reflector is not employed. The headlamp assembly 460 includes a lens 420 which is coupled to an integrated flexural member 430 by means of a glue track 432 which receives a mounting flange 422 at the lower end of lens 420. Flexural member 430 includes a lower leg 434 extending rearwardly and made of a flexible material, as in the prior embodiments, to allow its flexing in the event an object strikes the lens 420, the vehicle bumper 112 or hood 114. Inner surfaces 431 of member 430 are treated with a shiny material in one embodiment. A focusing lens assembly includes a plano convex lens 438 for focusing light from a lamp 436 mounted to housing 450 in a conventional manner. An annular gap 434 extends between lens assembly 435 and the rear wall 433 of flexural member 430. Thus, in the embodiment shown in FIG. 9, no reflector is employed but rather a light from the lamp is focused by lens 438 outwardly through the outer lens 420. The upper end of flexural member 430 includes a flexible leg 439 with an end 437 extending within glue track 457, which also receives the upper mounting flange 423 of lens 420 such that both the flexural member 430 and lens 420 are accommodated by the housing. The exposed surfaces 431 of upper arm 439, which is generally U-shaped and extends forwardly downwardly and then rearwardly to integrally join rear wall 433, are treated to provide a desired appearance for the assembly 460. The lower leg 434 of flexural member 430 includes a rearwardly projecting leg 438, which is received by glue track 458 in housing 450 and is bonded thereto by a suitable bonding adhesive, as in the prior embodiments. The housing 450 includes a peripherally extending socket or glue track, which is configured to selectively receive either both the lens 420 and/or flexural member 430 therearound, such that a continuous sealed engagement between the lens 420 and housing 450 through the flexural member 430 is achieved around the entire periphery of the assembly.

In all of the embodiments, the need for a separate bezel is eliminated and the features of a flexible member is integrally provided with a bezel. Although the embodiments illustrate the invention in vehicle headlamp assemblies, the same construction can be employed in other lamp assemblies including vehicle tail lamp assemblies or rugged commercial lighting fixtures.

It will become apparent to those skilled in the art that various modifications to the preferred embodiment of the invention as described herein can be made without departing from the spirit or scope of the invention as defined by the appended claims.

The invention claimed is:

1. An integrated flexible mounting member/bezel for a lamp assembly comprising:
   a flexural member having a wall made of a flexible material, said wall including a forward one of a track and flange and a rearward one of a track and flange having internal surfaces covered by a material of a predetermined color and reflectivity, wherein said forward one of a track and flange is shaped to receive a lamp lens and the rearward one of a track and flange is shaped to engage a lamp housing, said wall defining an opening for at least one of a reflector and focusing lens.

2. The integrated flexible mounting member/bezel as defined in claim 1 and including a reflector and wherein said wall includes an extension wall extending toward said reflector and having an edge extending within the outer diameter of an edge of the reflector such that, when assembled with a lens, said reflector and a housing, the flexural member/bezel presents a surface having said predetermined color and reflectivity.

3. The integrated flexible mounting member/bezel as defined in claim 1 wherein said flexible mounting member/bezel is made of a flexible polymeric material.

4. The integrated flexible mounting member/bezel as defined in claim 3 wherein said material has a predetermined appearance.

5. The integrated flexible mounting member/bezel as defined in claim 4 wherein said material is a reflective metallic aluminum coating.

6. The integrated flexible mounting member/bezel as defined in claim 2 wherein said extension wall is made of a flexible polymeric material.

7. A lamp assembly for a vehicle comprising:
   a housing;
   a bulb reflector mounted within said housing;
   a intermediate wall made of a flexible material coupled to said housing and extending forwardly thereof, wherein the interior surface of said intermediate wall is coated with a material having a predetermined color and reflectivity; and
   a lens coupled to an end of said intermediate wall remote from said housing.

8. The assembly as defined in claim 7 wherein said material is a metalized coating.

9. The assembly as defined in claim 8 wherein said metalized coating is an aluminum coating.

10. The assembly as defined in claim 8 wherein said flexible polymeric material is one of urethane thermoplastic (TPU), rubber modified polypropylene (TPO), urethane, or thermoplastic elastomer (TPE).

11. The assembly as defined in claim 7 wherein said intermediate wall is made of a flexible polymeric material.

12. The assembly as defined in claim 7 wherein said assembly is a headlamp assembly for a vehicle.

13. The assembly as defined in claim 7 wherein said intermediate wall includes an extension section projecting inwardly toward said reflector, and said extension is coated with a shiny material.

14. The assembly as defined in claim 7 wherein said intermediate wall includes an externally extending gimp.

15. An integrated flexible mounting member/bezel for a vehicle headlamp assembly comprising:
   a headlamp lens;
   a flexural member having a wall made of a flexible material, said wall including forwardly facing one of a track and flange and a rearwardly facing one of a track and flange having internal surfaces covered by a bright material, wherein said forward facing one of a track and flange is shaped to receive said headlamp lens;
   a lamp housing including the other of a track and flange for receiving said flexural member; and
   a bonding adhesive bonding said lens to said flexural member and said flexural member to said housing.

16. The structure as defined in claim 15 and further including a reflector mounted in said lamp housing.

17. The structure as defined in claim 16 wherein said wall includes an extension wall extending toward said reflector and having an edge extending within the outer diameter of an edge of the reflector such that the flexural member/bezel presents a bright surface.

18. The structure as defined in claim 17 wherein said flexible mounting member/bezel is made of a flexible polymeric material.

19. The structure as defined in claim 18 wherein said bright material is a deposited aluminum covering.

20. The structure as defined in claim 19 wherein said extension wall is made of a flexible polymeric material.

21. The structure as defined in claim 20 wherein said flexible polymeric material is one of urethane thermoplastic (TPU), rubber modified polypropylene (TPO), urethane, or thermoplastic elastomer (TPE).

22. An integrated flexible mounting member/bezel for a lamp assembly comprising:

a flexural member having a wall made at least partially of a flexible material, said wall including a forward one of a track and flange and a rearward one of a track and flange having internal surfaces covered by a material of a predetermined color and reflectivity, wherein said forward one of a track and flange is shaped to receive a lamp lens and the rearward one of a track and flange is shaped to engage a lamp housing, said wall defining an opening for at least one of a reflector and focusing lens, and wherein said wall is two-shot molded of polymeric materials having different rigidity and heat resistance.

23. The integrated flexible mounting member/bezel as defined in claim 22 wherein said material is a reflective metallic material.

24. The integrated flexible mounting member/bezel as defined in claim 23 wherein said reflective metallic material is aluminum.

25. A lamp assembly for a vehicle comprising:

a housing;

a intermediate wall made of a flexible material coupled to said housing and extending forwardly thereof, wherein the interior surface of said intermediate wall is coated with a material having a predetermined color and reflectivity;

a focusing lens coupled to said intermediate wall in spaced relationship to said housing; and a cover lens coupled to an end of said intermediate wall remote from said housing.

26. The assembly as defined in claim 25 wherein said material is a metalized coating.

27. The assembly as defined in claim 26 wherein said metalized coating is an aluminum coating.

28. The assembly as defined in claim 27 wherein said intermediate wall is at least partially made of a flexible polymeric material.

29. The assembly as defined in claim 28 wherein said flexible polymeric material is one of urethane thermoplastic (TPU), rubber modified polypropylene (TPO), urethane, or thermoplastic elastomer (TPE).

30. The assembly as defined in claim 29 wherein said intermediate wall is two-shot molded and includes polymeric material of a different rigidity in different areas.

31. The assembly as defined in claim 29 wherein said intermediate wall is two-shot molded and includes polymeric material of different heat resistance in different areas.

* * * * *